United States Patent
Balsiger et al.

(10) Patent No.: US 10,266,251 B2
(45) Date of Patent: Apr. 23, 2019

(54) POSITION SENSOR FOR ELECTROMECHANICAL ACTUATOR

(71) Applicant: HAMILTON SUNDSTRAND CORPORATION, Windsor Locks, CT (US)

(72) Inventors: Derick S. Balsiger, Mayer, AZ (US); Parag M. Kshirsagar, South Windsor, CT (US); Xin Wu, Glastonbury, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 417 days.

(21) Appl. No.: 14/993,730

(22) Filed: Jan. 12, 2016

(65) Prior Publication Data
US 2017/0197704 A1   Jul. 13, 2017

(51) Int. Cl.
*B64C 13/28*   (2006.01)
*G01D 5/14*   (2006.01)
*G01D 5/20*   (2006.01)

(52) U.S. Cl.
CPC ............. *B64C 13/28* (2013.01); *G01D 5/145* (2013.01); *G01D 5/147* (2013.01); *G01D 5/2013* (2013.01)

(58) Field of Classification Search
CPC ...... B64C 13/28; G01D 5/2013; G01D 5/145; G01D 5/147
See application file for complete search history.

(56) References Cited

U.S. PATENT DOCUMENTS

| | | | |
|---|---|---|---|
| 4,967,154 A | 10/1990 | Marantette | |
| 5,428,290 A | 6/1995 | Porcher | |
| 5,528,139 A * | 6/1996 | Oudet | G01B 7/30 324/207.2 |
| 5,670,876 A * | 9/1997 | Dilger | G01D 5/147 324/207.13 |
| 6,124,709 A * | 9/2000 | Allwine | G01D 5/145 324/207.2 |
| 2010/0181993 A1 | 7/2010 | Fernandez et al. | |
| 2010/0207614 A1 | 8/2010 | Kammer et al. | |
| 2015/0253153 A1* | 9/2015 | Smithanik | G01D 5/2013 324/207.25 |

FOREIGN PATENT DOCUMENTS

WO   2015068061 A2   5/2015

OTHER PUBLICATIONS

European Search Report Issued in EP Application No. 16198514.8, dated May 12, 2017, 8 pages.

* cited by examiner

Primary Examiner — Valentina Xavier
(74) Attorney, Agent, or Firm — Cantor Colburn LLP

(57) ABSTRACT

An electromechanical actuator includes a ground arm, an output arm rotatable about an axis of rotation relative to the ground arm and a position sensing arrangement to determine an angular position of the output arm relative to the ground arm. The position sensing arrangement includes a position sensor fixed at the ground arm. The position sensor is configured to sense magnetic reluctance. A sensed portion is located at the output arm proximate to the position sensor. The sensed portion includes a geometric variation in an output arm surface configured to vary a magnetic reluctance sensed at the position sensor as a function of angular position of the output arm relative to the ground arm.

13 Claims, 3 Drawing Sheets

“POSITION SENSOR FOR ELECTROMECHANICAL ACTUATOR

STATEMENT OF GOVERNMENT RIGHTS

This invention was made with government support under Contract Number FA8650-15-C-2500 awarded by the Air Force. The government has certain rights in the invention.

BACKGROUND

The subject matter disclosed herein relates to electromechanical actuators. More specifically, the present disclosure relates to position sensing of electromechanical actuators.

Many systems require actuators to manipulate various components. Rotary actuators rotate an element about an axis, such as flight control surfaces, for example, flaps and ailerons. In such flight applications, there has been a trend toward wings of thinner cross-sections, such that size and space available for placement of the actuator inside of the wing is limited. The trend has led to the use of a rotary actuator of a "hinge-line" design, wherein a rotational axis of the actuator is aligned with that of the flight control surface and the actuator acts as a hinge (hence the term "hinge-line"). This trend also raises the need for such an actuator with a tighter cross-section to fit the available space.

Such actuators often use position sensing apparatus to sense and track the actuator position. As the sizes of the actuators are reduced in response to the thin wing trend, the volume occupied by a conventional position sensor becomes a significant percentage of the total actuator volume and a significant percentage of the cost. Typical position sensing for electromechanical actuators tends to fall into two categories, rotary variable differential transformer (RVDT) and encoders. Whereas RVDTs provide absolute position determination on startup, they are relatively large and expensive. Encoders, while smaller and less expensive than RVDTs, require some motion at startup to determine the position.

SUMMARY

In one embodiment, an electromechanical actuator includes a ground arm, an output arm rotatable about an axis of rotation relative to the ground arm and a position sensing arrangement to determine an angular position of the output arm relative to the ground arm. The position sensing arrangement includes a position sensor fixed at the ground arm. The position sensor is configured to sense magnetic reluctance. A sensed portion is located at the output arm proximate to the position sensor. The sensed portion includes a geometric variation in an output arm surface configured to vary a magnetic reluctance sensed at the position sensor as a function of angular position of the output arm relative to the ground arm.

Additionally or alternatively, in this or other embodiments the geometric variation is a groove located at the output arm extending circumferentially about the axis of rotation. The groove progressively widens and/or deepens along its length.

Additionally or alternatively, in this or other embodiments the groove is radially centered on the position sensor.

Additionally or alternatively, in this or other embodiments the geometric variation is a pattern of holes in the output arm.

Additionally or alternatively, in this or other embodiments the pattern of holes varies in one or more of hole diameter, hole depth or hole spacing.

Additionally or alternatively, in this or other embodiments the position sensor includes a magnet fixed at the ground arm to generate a magnetic field, and a hall effect sensor to detect variation in the magnetic field as the output arm is rotated about the axis of rotation relative to the ground arm.

Additionally or alternatively, in this or other embodiments the hall effect sensor is positioned between the magnet and the output arm.

Additionally or alternatively, in this or other embodiments an output voltage of the hall effect sensor is indicative of the angular position of the output arm.

In another embodiment, a relative position sensing system for two components includes a position sensor fixed at a first component. The position sensor is configured to sense magnetic reluctance. A sensed portion is positioned at a second component proximate to the position sensor. The sensed portion includes a geometric variation in a second component surface configured to vary a magnetic reluctance sensed at the position sensor as a function of angular position of the second component relative to the first component.

Additionally or alternatively, in this or other embodiments the geometric variation is a groove located at the second component extending circumferentially about the axis of rotation. The groove progressively widens and/or deepens along its length.

Additionally or alternatively, in this or other embodiments the groove is radially centered on the position sensor.

Additionally or alternatively, in this or other embodiments the geometric variation is a pattern of holes in the second component. The pattern of holes varies in one or more of hole diameter, hole depth or hole spacing.

Additionally or alternatively, in this or other embodiments the position sensor includes a magnet fixed at the first component to generate a magnetic field and a hall effect sensor to detect variation in the magnetic field as the second component is rotated about the axis of rotation relative to the first component.

Additionally or alternatively, in this or other embodiments the hall effect sensor is located between the magnet and the second component.

Additionally or alternatively, in this or other embodiments an output voltage of the hall effect sensor is indicative of the angular position of the second component relative to the first component.

In yet another embodiment, a wing for an aircraft includes a fixed portion of the wing, and a control surface portion of the wing. The control surface portion is movable relative to the fixed portion. An electromechanical actuator drives movement of the control surface portion relative to the fixed portion and includes a ground arm secured to the fixed portion and an output arm secured to the control surface portion and rotatable about an axis of rotation relative to the ground arm. A position sensing arrangement determines an angular position of the output arm relative to the ground arm and includes a position sensor fixed at the ground arm. The position sensor is configured to sense magnetic reluctance. A sensed portion is located at the output arm proximate to the position sensor. The sensed portion includes a geometric variation in an output arm surface configured to vary a magnetic reluctance sensed at the position sensor as a function of angular position of the output arm relative to the ground arm.

Additionally or alternatively, in this or other embodiments the geometric variation is a groove located at the output arm extending circumferentially about the axis of rotation. The groove progressively widens and/or deepens along its length.

Additionally or alternatively, in this or other embodiments the geometric variation is a pattern of holes in the output arm. The pattern of holes varies in one or more of hole diameter, hole depth or hole spacing.

Additionally or alternatively, in this or other embodiments the position sensor includes a magnet fixed at the ground arm to generate a magnetic field and a hall effect sensor to detect variation in the magnetic field as the output arm is rotated about the axis of rotation relative to the ground arm.

Additionally or alternatively, in this or other embodiments an output voltage of the hall effect sensor is indicative of the angular position of the output arm.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
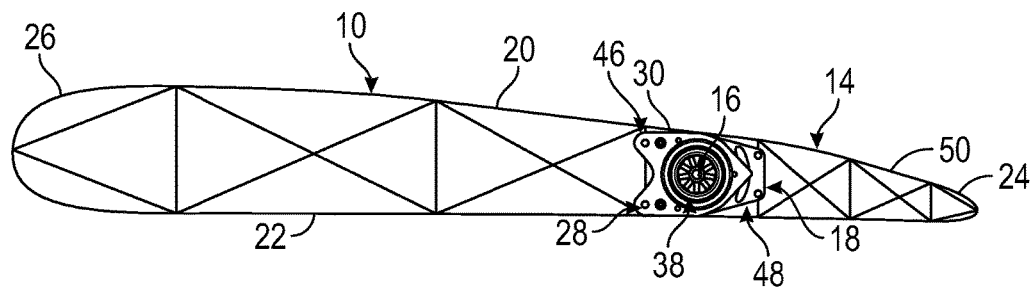
FIG. 1 is a schematic view of an embodiment of a wing including an electromechanical actuator.

Referring now to FIG. 1, a non-limiting exemplary embodiment of a wing of an aircraft (not shown) is generally indicated at 10. Although the wing 10 is disclosed herein as being implemented with a fixed-wing aircraft, such as an airplane, it should be appreciated that the wing 10 can be implemented with any suitable type of aircraft in general, and fixed-wing or rotary-wing aircraft (such as a helicopter), in particular.

As shown in FIG. 1, the wing 10 is one of two substantially similar wings of a lift system of the aircraft (in contrast, a rotor blade would be one of a plurality of substantially similar rotor blades of a rotor system of a helicopter). The wing 10 defines a root portion (not shown) that extends to a tip portion (not shown) through an aileron portion, generally indicated at 14, which acts as a flight-control or output-control surface (such as a wing flap). The aileron portion 14 also defines, in turn, an axis of motion of rotation 16 and includes an aileron spar, generally indicated at 18. The wing 10 further defines first and second opposing surfaces 20, 22, a trailing edge 24, and an opposing leading edge 26 and includes a wing spar, generally indicated at 28.

The wing 10 also includes a control system (not shown) that has an electromechanical hinge-line rotary actuator, generally indicated at 30, and a controller (not shown). The actuator 30 defines the axis of rotation 16. The controller may be mounted to or near to the actuator 30 and is operably linked to the actuator 30 and the control system. It is to be appreciated that while actuator 30 is described herein in the context of the wing 10, it is to be appreciated that the actuator 30 described herein may be utilized in a variety of applications where rotary actuators are used.

A stationary attachment bracket or ground arm 46 of the actuator 30 is mounted to the wing spar 28 and is configured to be attached to the interior structure of the wing 10. A rotatable attachment bracket or output arm 48 of the actuator 30 is mounted to a frame of or within an interior of the aileron portion 14. The mounting is highly flexible as long as the axis of rotation 16 of the aileron portion 14 is aligned with the axis of rotation 16 of the actuator 30. In some embodiments, the output arm 48 is mounted to the aileron spar 18.

It should be appreciated that the control system may also define a plurality of control surfaces 50 arranged within the aileron portion 14 and selectively deployed between the first and second surfaces 20, 22 to affect flight dynamics of the wing 10. Each control surface 50 defines first and second control surface portions. The actuator 30 is configured to rotate the control surface 50 from a first or neutral position, such that the control surface 50 is disposed within the wing 10, to a second or deployed position, such that the control surface 50 extends out of an outer periphery of the wing 10, by rotating the control surface about the axis of rotation 16 relative to the wing 10.

Figure 2:
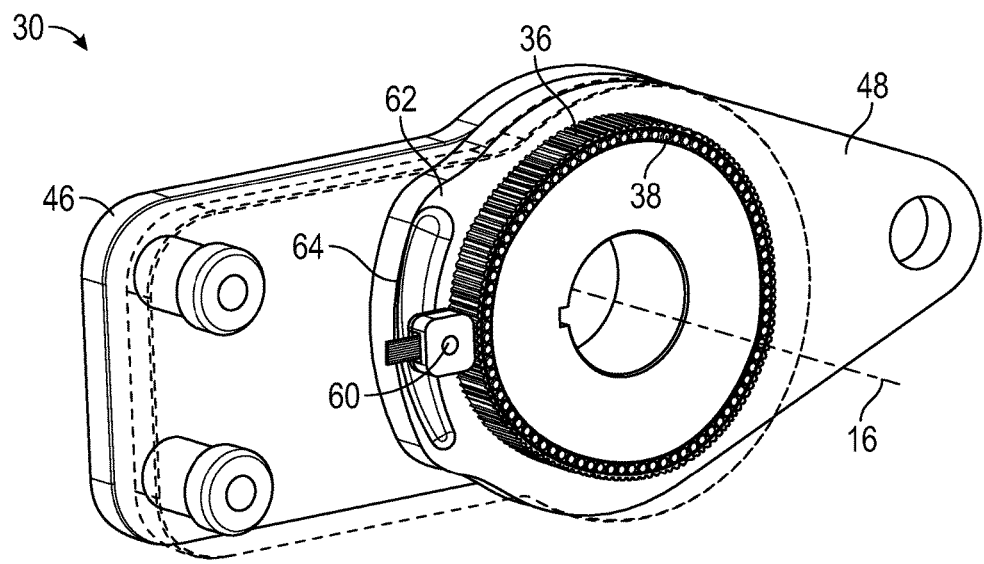
FIG. 2 is a perspective view of an embodiment of an electromechanical actuator.

Referring now to FIG. 2, an embodiment of the actuator 30 is illustrated. The actuator 30 includes a drive member 36 and a motor 38 disposed inside of and directly coupled to the drive member 36. In some embodiments, the motor 38 is arranged concentrically with the drive member 36. The drive member 36 is coupled to the output arm 48 to rotate the output arm 48, and thus the control surface to which the output arm 48 is secured, about the axis of rotation 16.

In some embodiments, it is necessary to sense and track rotational position of the output arm 48 as an indicator of angular position of the control surface 50. In the embodiment of FIG. 2, the actuator 30 includes a position sensing system 60 located thereat to sense and track the rotational position of the output arm 48 relative to the ground arm 46. The position sensing system 60 is located at the ground arm 46 and is interactive with a sensed portion 64 located at the output arm 48.

Figure 3:
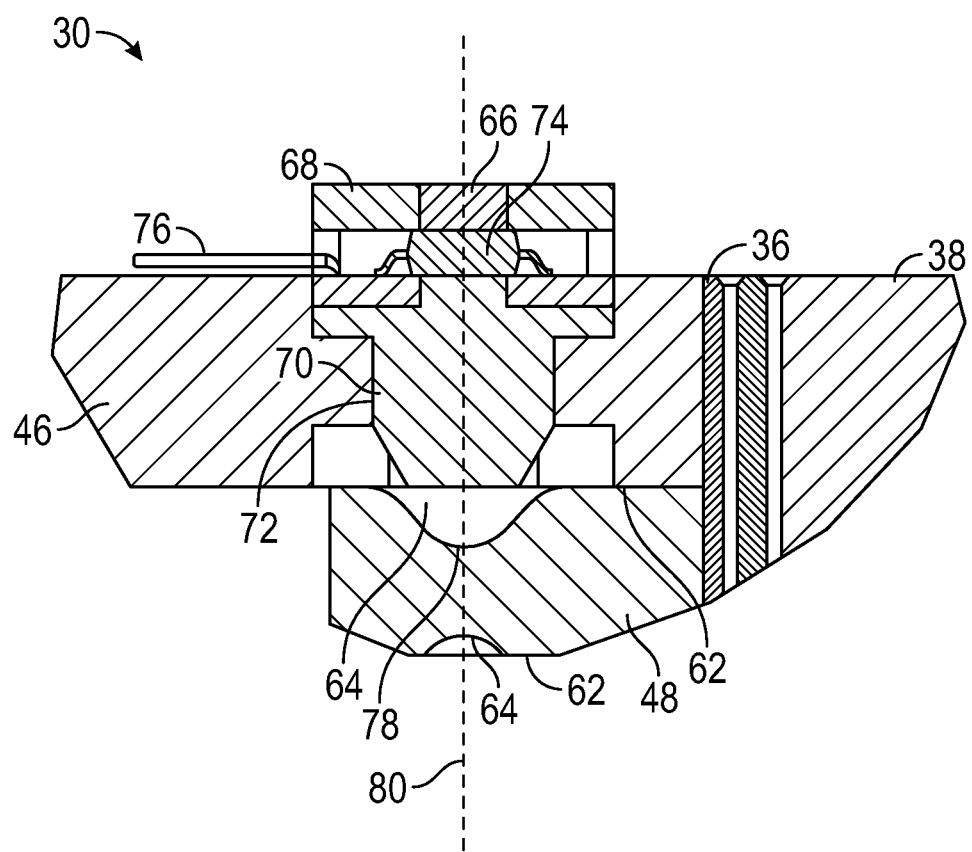
FIG. 3 is a cross-sectional view of an embodiment of a position sensor arrangement for an electromechanical actuator.

Referring now to FIG. 3, the position sensing system 60 will be described in more detail. The position sensing system 60 is a compact sensor which utilizes variations in magnetic reluctance to determine a position of the output arm 48 relative to the ground arm 46. The position sensing system 60 includes a magnet 66 used to generate a magnetic field. The magnet 66 is disposed at a magnet holder 68 and fixed to the ground arm 46. A sensor plug 70, used to control the magnetic field generated by the magnet 66 is positioned in a sensor opening 72 extending through the ground arm 46 toward the output arm 48. Between the sensor plug 70 and the magnet 66 is a hall effect sensor 74 to sense variations in the magnetic field and varies its output voltage depending on these variations. Sensor leads 76 extend from the position sensor 62 to output the hall effect sensor 74 voltage to the controller.

Figure 4:
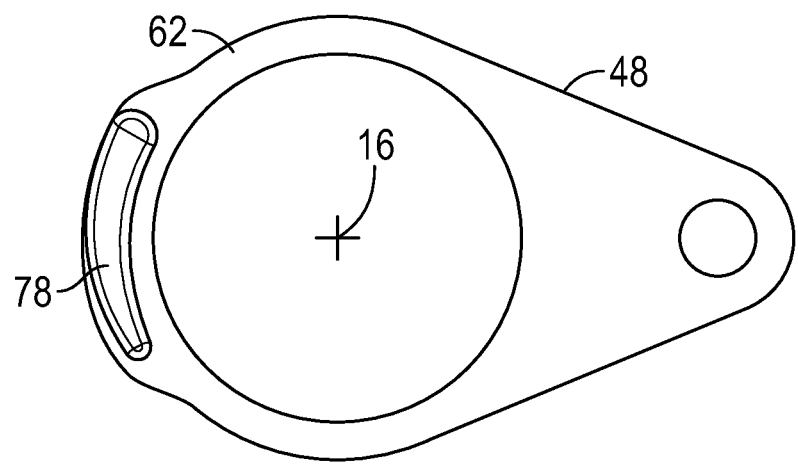
FIG. 4 is a plan view of an embodiment of an output arm for an electromechanical actuator.

The sensed portion 64 is located at the output arm 48, and in some embodiments comprises geometric variation in a surface 62 of the output arm 48. As shown in FIG. 3 and FIG. 4, the sensed portion 64 may comprise a groove 78 in the output arm 48. The groove 78 is centered on a sensor axis 80 and as shown in FIG. 4, is progressively wider and/or deeper as groove 78 extends circumferentially around the axis of rotation 16. The variation in groove 78 width and/or depth is that, as the output arm 48 is rotated about the axis of rotation 16 relative to the ground arm 46, a different reluctance in the magnetic field will be sensed by the relatively fixed position sensing system 60 fixed at the ground arm 46. Thus, magnetic reluctance becomes a function of angular position of the ground arm 46.

Figure 5:
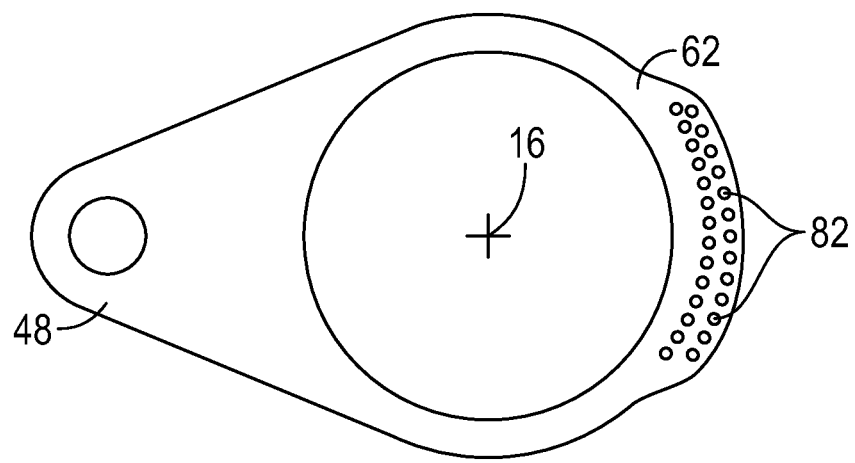
FIG. 5 is a plan view of another embodiment of an output arm for an electromechanical actuator.

In an alternative embodiment, as shown in FIG. 5, the geometric variation may be a pattern of circular holes 82, which increase in diameter and/or depth as the pattern extends circumferentially about the axis of rotation 16. Further, in some embodiments, the pattern of circular holes 82 may vary in spacing in addition to, or as an alternative to, varying in diameter and/or depth.

Further, referring again to FIG. 2, the position sensing system 60 may include two position sensing system 60 and two sensed portions 64, located at opposite faces of the output arm 48. The geometric variations at the opposing faces of the output arm 48 may be substantially opposing. For example, referring again to FIG. 4, where the groove 78 is at its widest and/or deepest at a first face of the output arm 48, the opposing groove 78 at an opposing second face of the output arm 48 is at its narrowest and/or shallowest. The same duplication may be done with the embodiment of FIG. 5.

The use of a reluctance-based position sensing system 60 for the actuator 30 allows the position sensing system 60 to be smaller and less costly than a typical actuator position sensor, and will further enable angular position sensing upon powering up, without needing slight movement of the output arm to ascertain position.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An electromechanical actuator, comprising:
   a ground arm;
   an output arm rotatable about an axis of rotation relative to the ground arm; and
   a position sensing arrangement to determine an angular position of the output arm relative to the ground arm, the position sensing arrangement including:
      a position sensor fixed at the ground arm, the position sensor configured to sense magnetic reluctance; and
      a sensed portion disposed at the output arm proximate to the position sensor, the sensed portion comprising a geometric variation in an output arm surface configured to vary a magnetic reluctance sensed at the position sensor as a function of angular position of the output arm relative to the ground arm;
      wherein the geometric variation is a groove disposed at the output arm extending circumferentially about the axis of rotation, the groove progressively widening and or deepening along its length.

2. The electromechanical actuator of claim 1, wherein the groove is radially centered on the position sensor.

3. The electromechanical actuator of claim 1, wherein the position sensor includes:
   a magnet fixed at the ground arm to generate a magnetic field; and
   a hall effect sensor to detect variation in the magnetic field as the output arm is rotated about the axis of rotation relative to the ground arm.

4. The electromechanical actuator of claim 3, wherein the hall effect sensor is disposed between the magnet and the output arm.

5. The electromechanical actuator of claim 3, wherein an output voltage of the hall effect sensor is indicative of the angular position of the output arm relative to the ground arm.

6. A relative position sensing system for two components, comprising:
   a position sensor fixed at a first component, the position sensor configured to sense magnetic reluctance; and
   a sensed portion disposed at a second component proximate to the position sensor, the sensed portion comprising a geometric variation in a second component surface configured to vary a magnetic reluctance sensed at the position sensor as a function of angular position of the second component relative to the first component;
   wherein the geometric variation is a groove disposed at the second component extending circumferentially about the axis of rotation, the groove progressively widening and or deepening along its length.

7. The position sensing system of claim 6, wherein the groove is radially centered on the position sensor.

8. The position sensing system of claim 6, wherein the position sensor includes:
   a magnet fixed at the first component to generate a magnetic field; and
   a hall effect sensor to detect variation in the magnetic field as the second component is rotated about the axis of rotation relative to the first component.

9. The position sensing system of claim 8, wherein the hall effect sensor is disposed between the magnet and the second component.

10. The position sensing system of claim 8, wherein an output voltage of the hall effect sensor is indicative of the angular position of the second component relative to the first component.

11. A wing for an aircraft, comprising:
    a fixed portion of the wing;
    a control surface portion of the wing, the control surface portion movable relative to the fixed portion;
    an electromechanical actuator to drive movement of the control surface portion relative to the fixed portion, the electromechanical actuator including:
       a ground arm secured to the fixed portion;
       an output arm secured to the control surface portion and rotatable about an axis of rotation relative to the ground arm; and
       a position sensing arrangement to determine an angular position of the output arm relative to the ground arm, the position sensing arrangement including:
          a position sensor fixed at the ground arm, the position sensor configured to sense magnetic reluctance; and
          a sensed portion disposed at the output arm proximate to the position sensor, the sensed portion comprising a geometric variation in an output arm surface configured to vary a magnetic reluctance sensed at the position sensor as a function of angular position of the output arm relative to the ground arm;
          wherein the geometric variation is a groove disposed at the output arm extending circumferentially about the axis of rotation, the groove progressively widening and or deepening along its length.

12. The wing of claim 11, wherein the position sensor includes:
   a magnet fixed at the ground arm to generate a magnetic field; and
   a hall effect sensor to detect variation in the magnetic field as the output arm is rotated about the axis of rotation relative to the ground arm.

13. The wing of claim 12, wherein an output voltage of the hall effect sensor is indicative of the angular position of the output arm.

* * * * *